2 Sheets—Sheet 1.
R. K. BOYLE.
Recorder for Long Telegraph Lines.
No. 221,151. Patented Nov. 4, 1879.
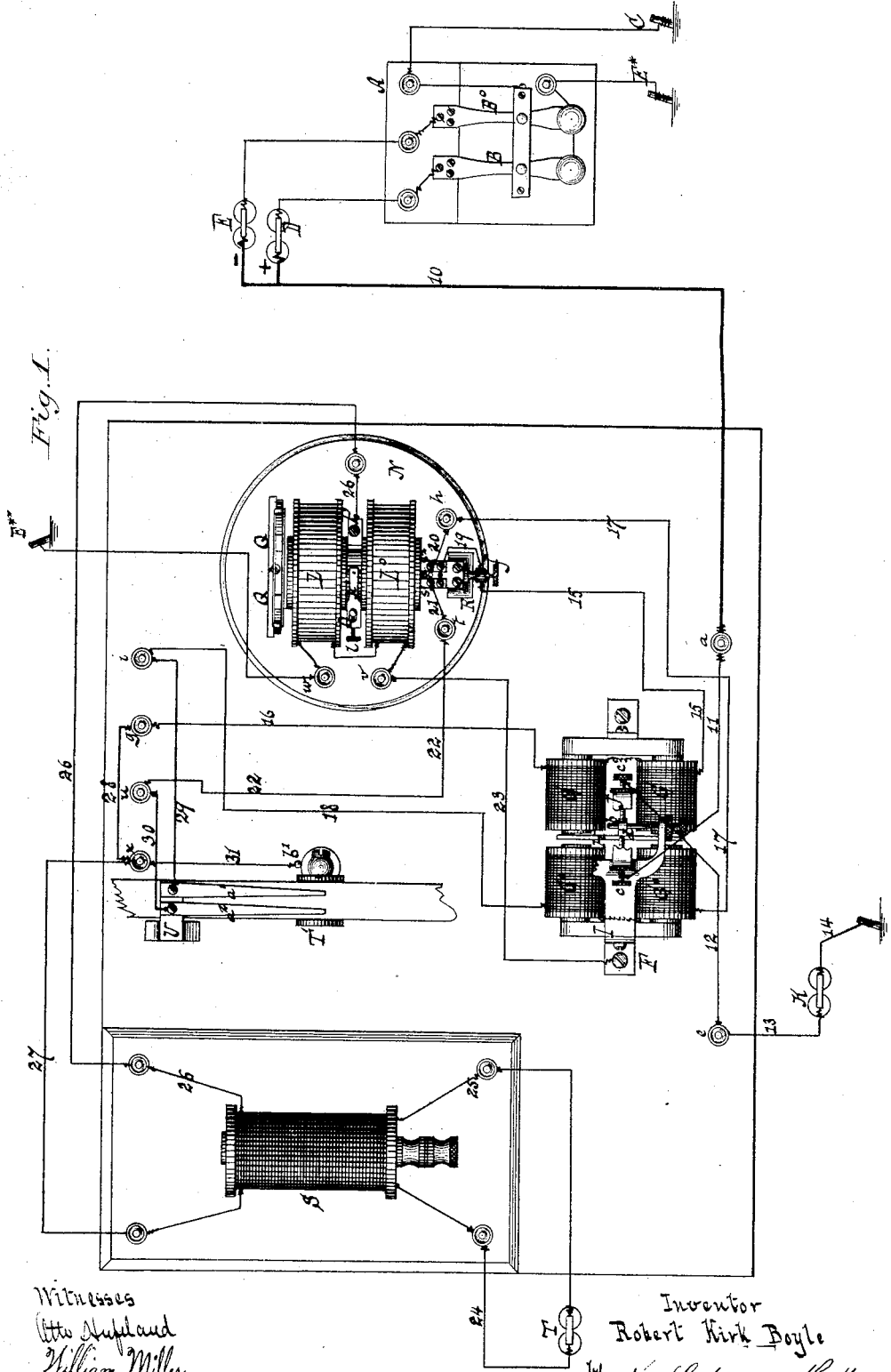

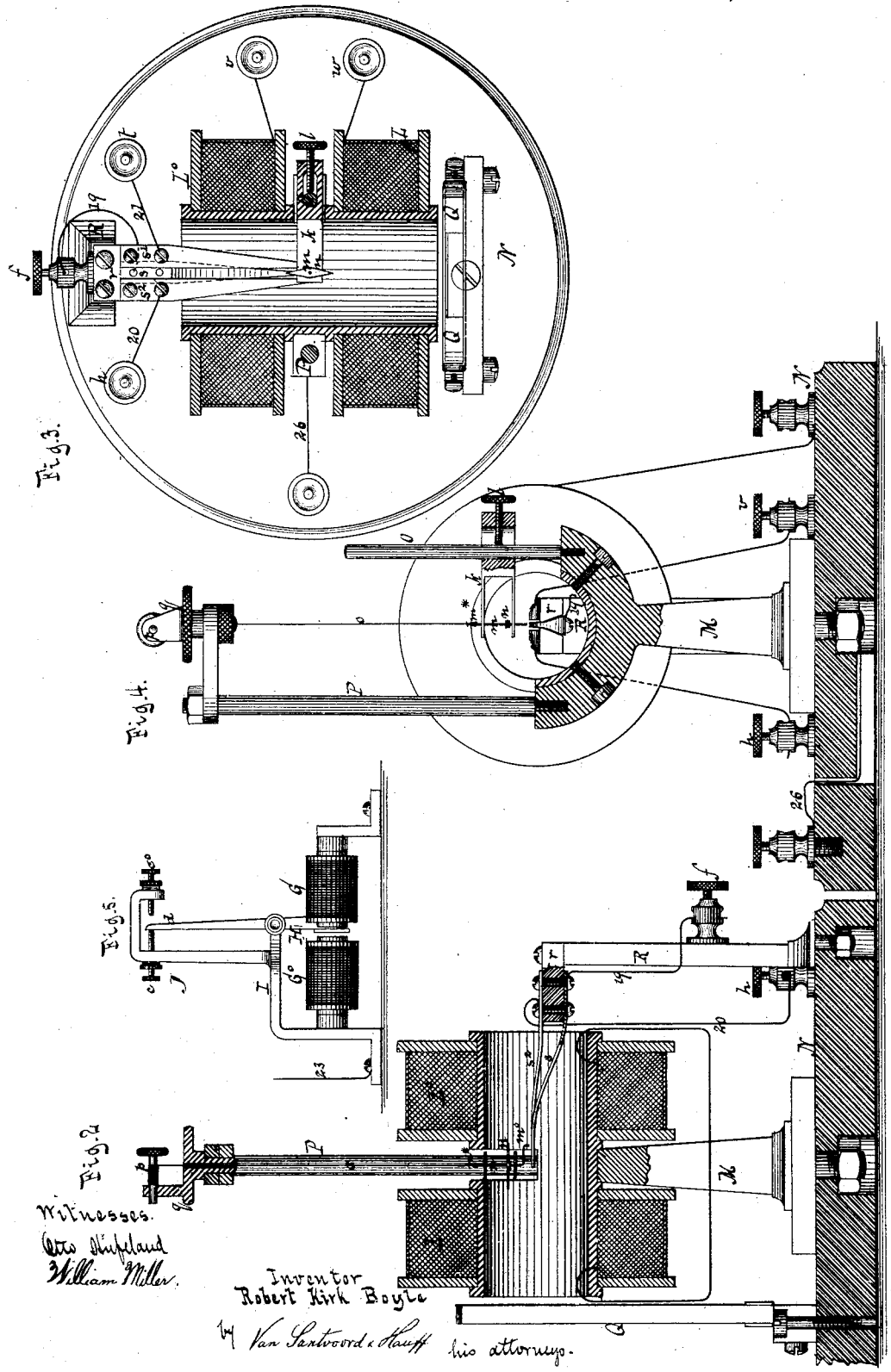

UNITED STATES PATENT OFFICE.

ROBERT K. BOYLE, OF BROOKLYN, NEW YORK.

IMPROVEMENT IN RECORDERS FOR LONG TELEGRAPH-LINES.

Specification forming part of Letters Patent No. 221,151, dated November 4, 1879; application filed March 24, 1879.

*To all whom it may concern:*

Be it known that I, ROBERT KIRK BOYLE, of Brooklyn, county of Kings, and State of New York, have invented a new and useful Improvement in Telegraphic Recording Apparatus, which invention is fully set forth in the following specification, reference being had to the accompanying drawings, in which—

Figure 1 represents a plan or top view of my apparatus with its connections. Fig. 2 is a vertical section of the receiving apparatus detached. Fig. 3 is a horizontal section of the same. Fig. 4 is a transverse section of the same. Fig. 5 represents a side view of my automatic switch.

Similar letters indicate corresponding parts.

It is well known that in transmitting messages over long lines or cables it is desirable to employ a feeble battery and have the receiving part of the apparatus as light and delicately mounted as possible; also, that there is a certain amount of retardation of the electric waves in both directions, so as to almost fill up the spaces between them, which retardation has a tendency to hold the receiving device or needle in the position the wave has given, not allowing sufficient time for it to return to zero before the succeeding wave is upon it. Various means are used in order to assist the movable parts of the receiving apparatus to give distinct signs; but if the waves are sent rapidly they accomplish the desired object only in a partial way, while, if the waves come slow, distinct signs are obtained. Now it is evident that if the cable or line could be cleared of all surplus electricity after the needle has been deflected to one side the needle would immediately return to its position of rest or zero, and that electric waves could be sent over the cable or line from the transmitting end with increased rapidity. Keeping these facts in view, I have constructed an apparatus requiring only a light battery-power with an exceedingly light magnetic needle, capable of recording on proper chemically-prepared paper with great speed, and clearing the line or cable of all remaining electricity after each movement of the needle or recording device by throwing on the line or cable an opposing battery at the receiving end.

My invention consists in the combination, with a telegraph line or cable, of a receiving device or magnetic needle, a secondary or opposing battery, and an automatic switch to change the cable or line connection at each movement of the needle or receiving device from said receiving device and earth to the secondary or opposing battery and earth for clearing the line or cable of all surplus electricity; also, in a receiving apparatus composed of two coils, a magnetic needle, a bent arm which oscillates with the needle, a fiber for supporting the bent arm and the needle, two permanent magnets, and two or more independent fingers with suitable connections, so that by each oscillation of the needle the connections of the main line or cable are changed; further, in an automatic switch composed of two electro-magnets, an armature common to both, and provided with a tail which oscillates between two contact-points, and an independent or secondary battery, whereby, whenever the tail of the armature bears against one of the contact-points, the current of the line or cable is thrown on the recording device; but when the tail of said armature bears against the other point of contact an opposing current from the secondary or opposing battery is thrown on the line or cable to clear the same from all surplus electricity; also, in the combination, with a telegraph line or cable, of an automatic switch, a receiving device, a recording device, and an induction-coil, so that the current of the induction-coil is automatically changed from the switch to the recording device, and vice versa; further, in the combination, with a telegraph line or cable, of two electro-magnets, an armature common to both, an induction-coil or other equivalent source of electricity for charging the electro-magnets, and a receiving device which serves to change the current of the induction-coil or other source of electricity from one electro-magnet to the other.

In the example shown in the drawings 1 have represented a transmitter, A, which is constructed with two keys, B B⁰, an earth-connection, C, and two batteries, D and E. The battery D connects with the key B and the line-wire or cable 10, and the battery E connects with the key B⁰, and also with the line-wire or cable 10, but with this difference, that if the positive pole of battery D is connected with the line-wire or cable 10, then the negative pole of battery E connects with said cable or line-wire, and vice versa. Any other suitable transmitter may, however, be substituted for the device above described.

The cable or line-wire 10 is connected to a binding-post, $a$, in the base F of an automatic switch. In the example shown in the drawings this switch is composed of two electro-magnets, G G$^0$, which are placed face to face, and between which is situated an armature, H, common to both. This armature is secured to a rock-shaft, $b$, which has its bearings in a metallic frame, I, and is in metallic contact with this frame. From this frame rises a metallic standard, J, in the upper ⊓-shaped end of which are secured two screws, $c$ $c^0$, one opposite the other, and both insulated from the standard or frame. Between the tips of these screws extends the tail $d$ of the armature H, so that if the electro-magnet G is vitalized this tail is brought to bear against the screw $c$, and if the electro-magnet G$^0$ is vitalized the tail $d$ is brought to bear against the screw $c^0$. The screw $c$ connects, by a wire, 11, with the binding-post $a$, and through it with the line-wire or cable 10. The screw $c^0$ connects, by a wire, 12, with a binding-post, $e$, from which extends a wire, 13, to one pole of a battery, K, the opposite pole of which is connected, by a wire, 14, to the earth. The poles of the battery K are so placed that when this battery is thrown on the line or cable the current will neutralize the current of the line-battery D.

One end of the helix of the electro magnet G connects, by a wire, 15, with a binding-screw, $f$, in the receiving apparatus, and its other end connects, by a wire, 16, with a binding-screw, $g$, in the recording apparatus. One end of the helix of the electro-magnet G$^0$ connects, by a wire, 17, with a binding-post, $h$, in the receiving apparatus, and the other end of such helix connects, by a wire, 18, with a binding-post, $i$, in the recording apparatus.

My receiving apparatus consists of two coils, L L$^0$, the tubular core of which is supported at the middle of its length on a post, M, which rises from a rubber base, N. From the post M rise two rods, O P, between the coils L L$^0$, and on the shorter rod, O, is secured a forked bracket, $k$, which can be adjusted by means of a set-screw, $l$. The ends of the forked bracket $k$ form the bearings for a platinum wire, $m$, and on this wire, between the two branches of the fork $k$, is mounted the magnetic needle $n$. That portion of the platinum wire which is situated between the lower branch of the fork $k$ is bent to form a crank, $m^0$, and the upper end of said platinum wire forms a loop, $m^*$, in which is secured the lower end of a fine silk thread or fiber, $o$, the upper end of which is fastened to a button, $p$, that is mounted in a bracket, $q$, secured to the upper end of the long rod, P. (See Figs. 2 and 4.) By turning the button $p$ the fiber $o$ is wound or unwound, and it can be so adjusted that the platinum wire $m$, with the needle $n$, are suspended from said fiber, and free to turn in either direction.

Opposite to the outer end of the coil L are placed two permanent magnets, Q Q, which have a tendency to retain the needle $n$ at zero; and opposite to the outer end of the coil L$^0$ is situated a metallic post, R, which rises from the base N, and on the top of which is firmly secured a block, $r$, of india-rubber, to which are attached three metallic fingers, $s$ $s'$ $s^2$, which are insulated from each other.

The middle finger, $s$, connects, by a wire, 19, Fig. 2, with the binding-post $f$, and through this post and wire 15 with one end of the helix of the electro-magnet G in the switch. (See Fig. 1.) The finger $s^2$ connects, by a wire, 20, with the binding-post $h$, and through it and wire 17 with one end of the helix of electro-magnet G$^0$ in the switch. The finger $s'$ connects, by a wire, 21, with a binding-post, $t$, and through this binding-post and a wire, 22, with a binding-post, $u$, in the recording apparatus. (See Fig. 1.)

The helices of the coils L L$^0$ are connected together, and they connect at one end, through binding-post $v$ and wire 23, with the metallic frame I of the switch, and through this frame, the switch-armature H, contact-screw $c$, and wire 11 with the cable 10, and through the cable and the transmitter with the earth E*. The other end of the helices L L$^0$ connects, through binding-post $w$, with the earth E**. If a current of electricity is thrown on the cable 10 the same current passes through the helices L L$^0$, and the needle $n$ is deflected either to the right or to the left, according to the nature of such current.

For the purpose of vitalizing the electro-magnets G G$^0$ of the switch, and also for recording on chemically-prepared paper, I use an induction-coil, S, the primary helix of which connects, by wires 24 and 25, with the opposite poles of a local battery, T, while one end of its secondary helix connects, by a wire, 26, with the fork $k$, that supports the platinum wire $m$ and needle $n$ in the receiving-instrument, and the other end of said secondary helix connects, by a wire, 27, with a binding-post, $x$, in the recording-instrument, and through this binding-post, wire 28, binding-post $g$, wire 16, helix of electro-magnet G, wire 15, binding-post $f$, and wire 19 with the middle finger, $s$, in the receiving-instrument, so that when the needle $n$ is at zero and the crank of the platinum wire $m$ over the middle finger, $s$, the electro-magnet G is vitalized, and the tail of the switch-armature is held in contact with the screw $c$, thereby closing the circuit of the cable or line-wire through the helices L L$^0$ in the receiver whenever either one or the other of keys B B$^0$ in the transmitter is moved to its closing position.

For the purpose of recording, I use two pens, $a'$ $a^2$, and a metallic drum, T', over which passes a strip of chemically-prepared paper, and which is caused to revolve by suitable mechanism. The pens are supported on a bar, U, of india-rubber, and they are insulated from each other. The pen $a'$ connects, by wire, 29 and binding-post $i$, with wire 18; the pen $a^2$, by wire 30 and binding-post $u$, with wire 22; and the paper cylinder $T'$ connects, by the stud $b'$, wire 31, and binding-post $x$, with wire 27.

If the needle $n$ in the receiving-instrument is at zero the current from the induction-coil S vitalizes the switch-magnet G, and the switch-armature H bears against the contact-screw $c$, as already stated. If the key B of the transmitter is now closed a current from battery D is thrown on the cable 10 and on the coils L $L^0$ of the receiver, and the needle $n$ is deflected, carrying the crank of the platinum wire over the finger $s^2$ in the receiver. The current of the induction-coil is thereby removed from switch-magnet G and thrown on switch-magnet $G^0$ through wire 26, fork $k$, platinum wire $m$, finger $s^2$, wires 20 and 17, helix $G^0$, wires 18 and 29, pen $a'$, drum $T'$, stud $b'$, and wires 31 and 27 back to induction-coil S; the pen $a'$ produces a mark on the paper, and at the same time the switch-magnet $G^0$ is vitalized, the switch-armature H changes to contact-point $c^0$, the current of battery D on the cable and on the coils L $L^0$ is broken, the needle returns to zero, the current of the opposing battery K is closed through wires 12, contact-screw $c^0$, armature H, frame I, cable 10, and transmitter to the ground C, through the ground and wire 14 back to the battery; the cable is cleared of all surplus electricity, and by the return motion of the needle to zero the induced current from coil S is taken off from switch-magnet $G^0$ and again thrown on switch-magnet G, and the switch-armature is returned to the position shown in Fig. 1, ready for the next signal.

If the key $B^0$ of the transmitter is closed the pen $a^2$ is caused to record, as will be readily seen by following the connections, the needle $n$ being deflected in this case so as to bring the crank of the platinum wire over finger $s'$. A second opposing battery must in this case be provided, the poles of which are reverse to those of battery E, so as to clear the cable from the surplus electricity.

What I claim as new, and desire to secure by Letters Patent, is—

1. The combination, with a telegraph line or cable, of a receiving device or magnetic needle, a secondary or opposing battery, and an automatic switch to change the cable or line connection at each movement of the needle or receiving device from such receiving device and earth to the secondary or opposing battery and earth, substantially as herein described, for clearing the line or cable of its surplus electricity.

2. The combination, in a telegraphic receiving apparatus, of two coils, L $L^0$, a needle mounted on a bent arm, a fork for guiding said bent arm, a fiber for supporting the bent arm, two permanent magnets for keeping the needle at zero, and two or more metallic fingers, $s$ $s'$ $s^2$, all constructed and adapted to operate substantially as and for the purpose shown and described.

3. The combination, with a telegraph line or cable, of two electro-magnets, G $G^0$, an armature common to both, contact-screws $c$ $c^0$, a secondary or opposing battery, and a recording device, all constructed and adapted to operate substantially as shown and described.

4. The combination, with a telegraph line or cable, of an automatic switch, a receiving device, a recording device, and an induction-coil, all connected and adapted to operate substantially as set forth.

5. The combination, with a telegraph line or cable, of two electro-magnets, G $G^0$, an armature common to both, contact-screws $c$ $c^0$, an induction-coil or other equivalent source of electricity for charging the electro-magnets G $G^0$, and a receiving device which serves to change the current of the induction-coil or other source of electricity from one electro-magnet to the other, all constructed and adapted to operate substantially as shown and described.

R. K. BOYLE.

Witnesses:
 W. HAUFF,
 E. F. KASTENHUBER.